May 14, 1963  T. F. TRIBE  3,089,448
MACHINES FOR FABRICATING SHEET-METAL PANEL STRUCTURES
Filed Aug. 8, 1960  10 Sheets-Sheet 1

Inventor
Thomas F. Tribe
By Kenyon, Palmer & Stewart
Attorneys

May 14, 1963     T. F. TRIBE     3,089,448
MACHINES FOR FABRICATING SHEET-METAL PANEL STRUCTURES
Filed Aug. 8, 1960     10 Sheets-Sheet 2

May 14, 1963 T. F. TRIBE 3,089,448
MACHINES FOR FABRICATING SHEET-METAL PANEL STRUCTURES
Filed Aug. 8, 1960 10 Sheets-Sheet 6

Inventor
Thomas F. Tribe
By Kenyon, Palmer & Stewart
Attorneys

United States Patent Office 3,089,448
Patented May 14, 1963

3,089,448
MACHINES FOR FABRICATING SHEET-METAL PANEL STRUCTURES
Thomas Francis Tribe, Dudley, England, assignor of one-half to British Federal Welder and Machine Company Limited
Filed Aug. 8, 1960, Ser. No. 48,213
Claims priority, application Great Britain Sept. 3, 1959
6 Claims. (Cl. 113—1)

This invention concerns machines for fabricating sheet-metal panel structures such as vehicle doors, trunk lids and vehicle floor assemblies. The invention more particularly relates to assembling sheet-metal panels by welding operations and/or by flange clinching operations to form panel structures such as those referred to.

The object of this invention is to enable panel structures to be fabricated in a relatively simple manner whereby the number of workmen involved is much reduced compared with existing procedures. It is also an object of the invention to permit unskilled labour to be extensively used.

According to this invention the panels are releasably carried by a frame which is reciprocated between at least a pair of spaced stations at each of which a fabricating operation is to be performed on the panels and there is, for each station, means for holding the panels in position for the fabricating operation when released from the frame, the fabricating operations, the frame reciprocation and the panel-holding means being controlled so that all the panels are simultaneously advanced by the frame from one work station to the next station, the fabricating operations at all the stations are performed at the same time and the panels are transferred from the frame to the panel-holding means so that said means secures the panels before release from the frame and vice versa. It is preferred that the fabricating operations are performed while the panels are held by said panel-holding means.

Practical applications of this invention will now be described, by way of example only, with reference to the accompanying drawings whereof.

Referring to FIGS. 1 to 6: each vehicle door comprises inner and outer panels 10, 11 respectively and it is required that the pre-formed upstanding flange 12 of panel 10 be folded over the marginal flange 13 of panel 11 and pressed down or clinched thereto and that the flanges of the panels be welded before and after the clinching operation. There is a tack-welding operation to hold the panels together in predetermined relative positions followed by a first welding operation to unite marginal flange 13 and panel 10; thereafter the clinching operation is performed and finally the clinched flange 12 is welded to the marginal flange 13.

The machine comprises a frame 14 mounted by rollers 15 on a structure 16 and connected to the rod 17 of a pneumatic ram 18 by which the frame is reciprocated. The panels 12, 13 are placed by an operator on a support pad 19 and when the panels are correctly located on the pad they are held thereto by pneumatic clamps 20 carried by frame 14.

The frame 14 is mounted on a lower beam 21 of structure 16 and a parallel upper beam 22 carries a pneumatic holding-down ram 27, one for each working station. The tack weld, first weld, clinching and final-weld stations are indicated respectively at 23, 24, 25 and 26. Each ram 27 has a holding-down pad 28 to engage panel 11 and press the assembly of panels down upon support pad 19. The beam 22 also carries welding heads 29 at stations 24 and 26 and clinching units 30 at station 25. The units 30 may be hydraulic, pneumatic or mechanical tools for folding over and clinching flange 12. It is preferred that the units 30 be operated pneumatically and that the tools for folding and clinching be as described in U.S. application Serial No. 48,214, filed August 8, 1960.

Beneath beam 21 is a pneumatic ram 31 for raising and lowering support pad 19, a ram 31 being provided for each working station 24/26. The rams 31 are actuated conjointly with the corresponding ram 27 so that the panel assembly (while secured to frame 14 by clamps 20) is clamped between pads 19, 28. Thereafter, the assembly between pads 19, 28 is raised above frame 14 so that the fabricating operation is carried out by welding heads 29 or clinching units 30. The assembly is next lowered (by appropriate actuation of rams 27, 31) and the lowered panel assembly is then secured to frame 14 by clamps 20, the clamps 20 being applied before pads 19, 28 release the panel assembly.

The horizontal distance between each of the working stations is the same and frame 14 has a fixed movement equal to this distance.

The sequence of operations in making a door will now be described.

Figure 1:
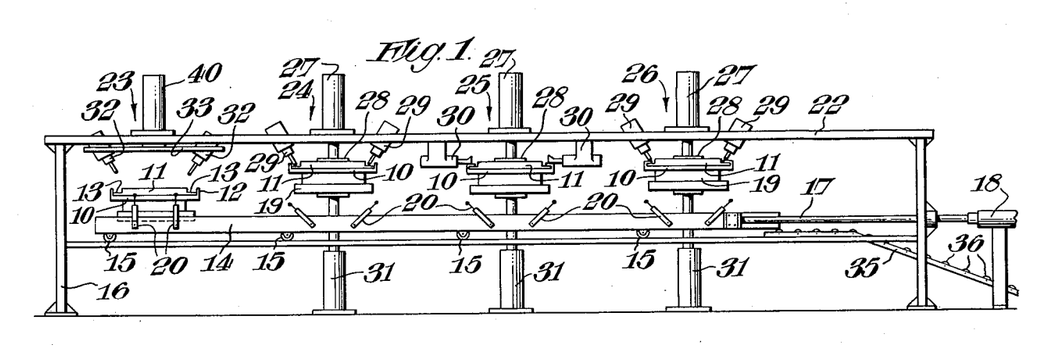
FIGS. 1 to 6 are diagrammatic views of a machine for fabricating vehicle doors showing the successive steps involved.

In FIG. 1 panels 10 and 11 have been placed by an operator on pad 19 at station 23, the panels being correctly located by the operator. When the operator is ready he presses a control switch and the sequence of operations is initiated. Firstly, clamps 20 at station 23 secure the panels 10, 11 in position and hold them in pre-set position on frame 14. At station 23 there are tack welding heads 32 carried by a sub-frame 33, mounted at 34, for rising and falling movement performed by pneumatic ram 40. When sub-frame 33 is lowered heads 32 engage flange 13 and panel 10 and tack weld them together.

While the panel clamping and the tack-welding operations proceed at station 23 the other fabricating operations are simultaneously proceeding at stations 24, 25 and 26, as will be described.

Figure 2:
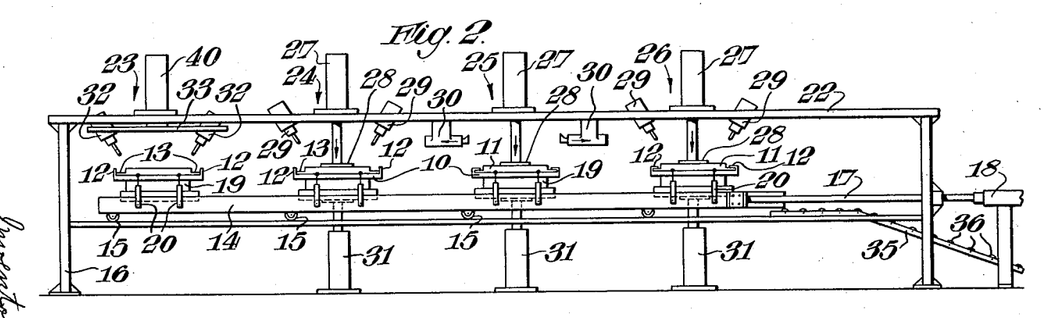
Figure 3:
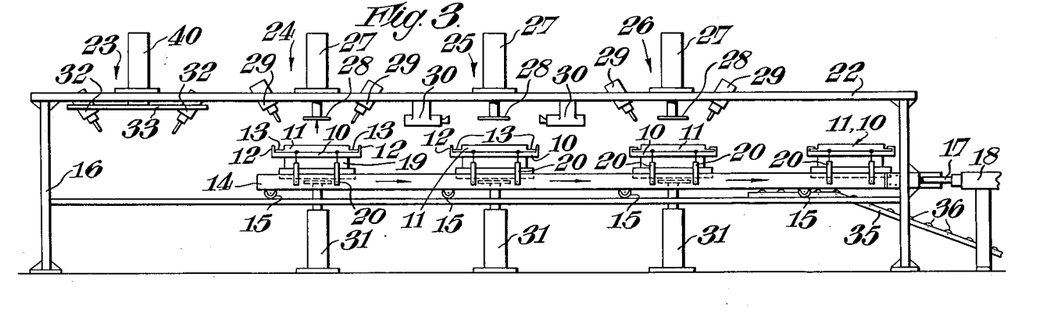
Figure 4:
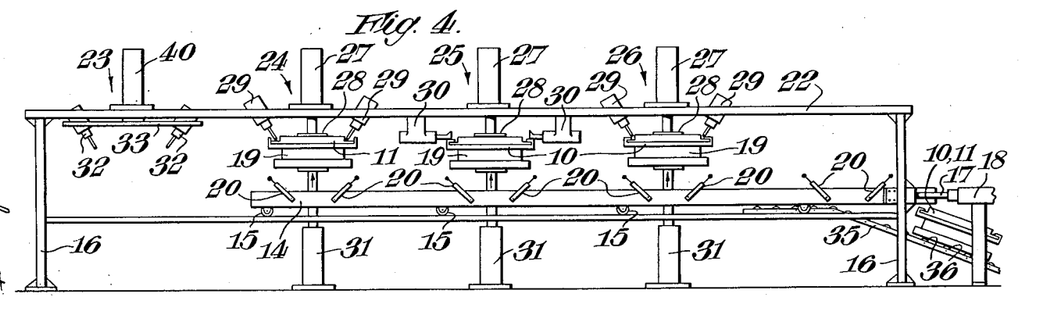

After the operations at station 23 have been completed (and also the operations at stations 24, 25 and 26 as shown in FIG. 2) ram 18 is actuated to advance frame 14 to carry the panel assembly clamped thereto at station 23 to station 24 (FIG. 3). Simultaneously the panel assembly will be moved with frame 14 from station 24 to station 25, from the latter to station 26 and from station 26 to an unloading ramp 35 comprising, for instance, free rollers 36. Any other suitable conveyor may be used instead of ramp 35.

With frame 14 in its advanced position (and while the tack-welded panel assembly is secured to the frame by clamps 20) rams 31 and 27 are actuated so that the tack-welded panel assembly is clamped between pads 19 and 28 at station 24. The clamps 20 are then released—this is diagrammatically illustrated in FIG. 4 by the clamps 20 being moved sideways from the vertical: compare FIGS. 3 and 4—while the panel assembly remains clamped between pads 19 and 28 and thereafter the assembly is raised so that heads 29 at station 24 performs the first welding operation on the tack-welded panel assembly. While this welding operation is taking place units 30 at station 25 and welding heads 29 at station 26 are simultaneously performing their respective operations.

Figure 5:
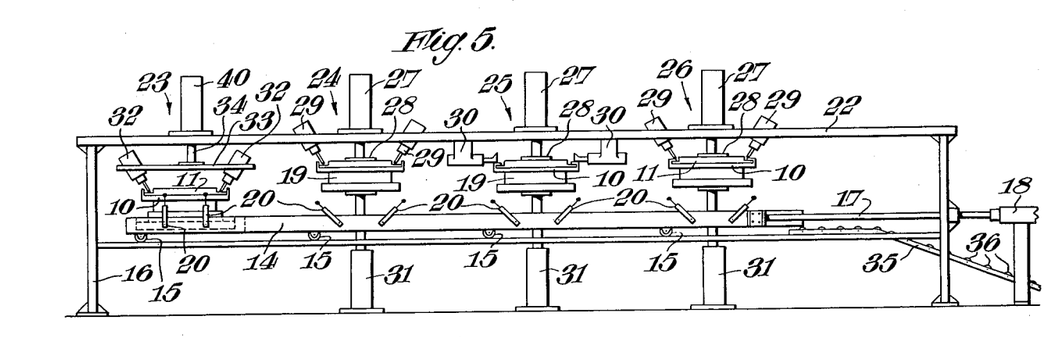
Figure 6:
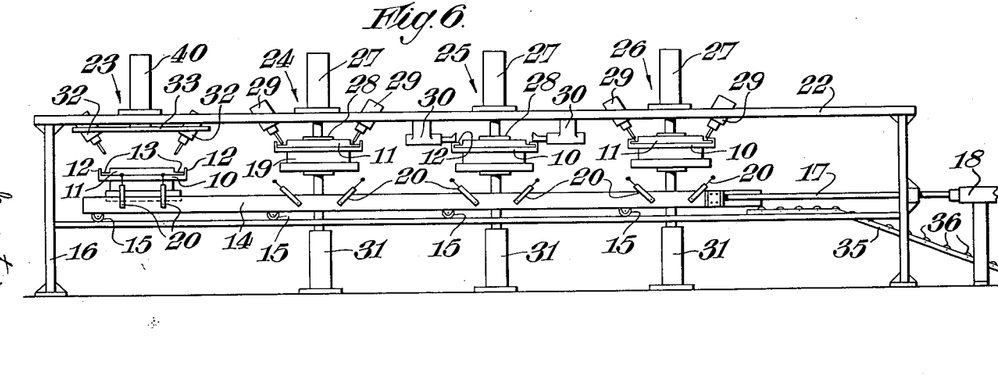
Figure 7A:
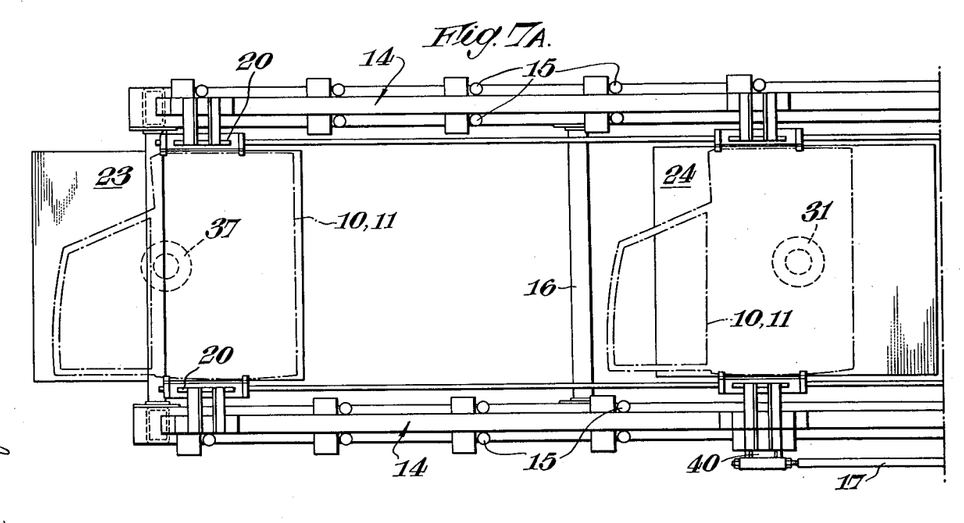
FIGS. 7A to 7D are plan views of parts of the machine of FIGS. 1 to 6, each view being of a different work station.
Figure 7B:
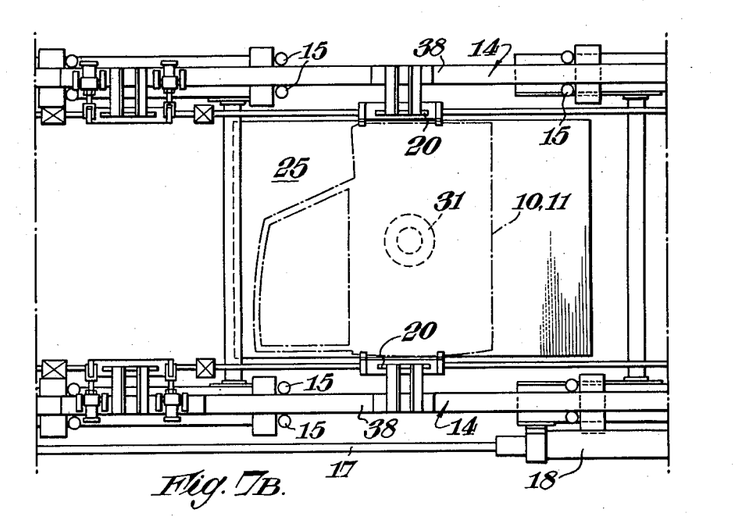
Figure 7C:
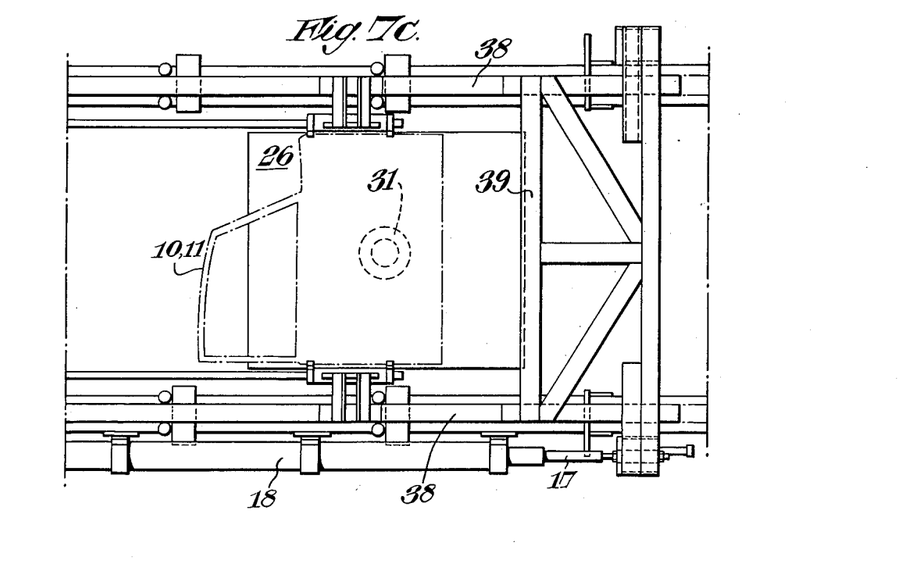
Figure 7D:
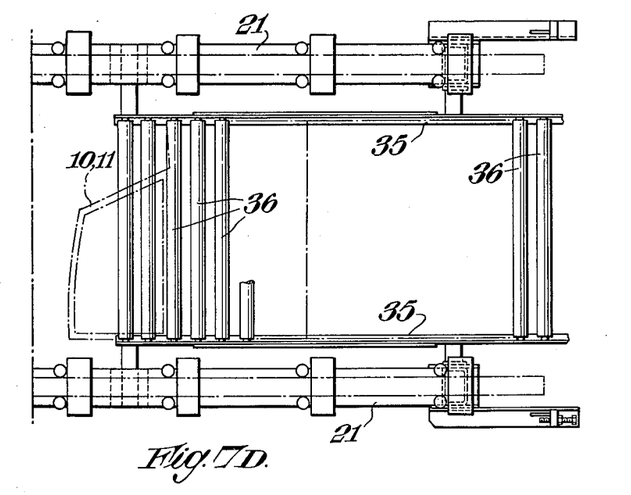
Figure 8A:
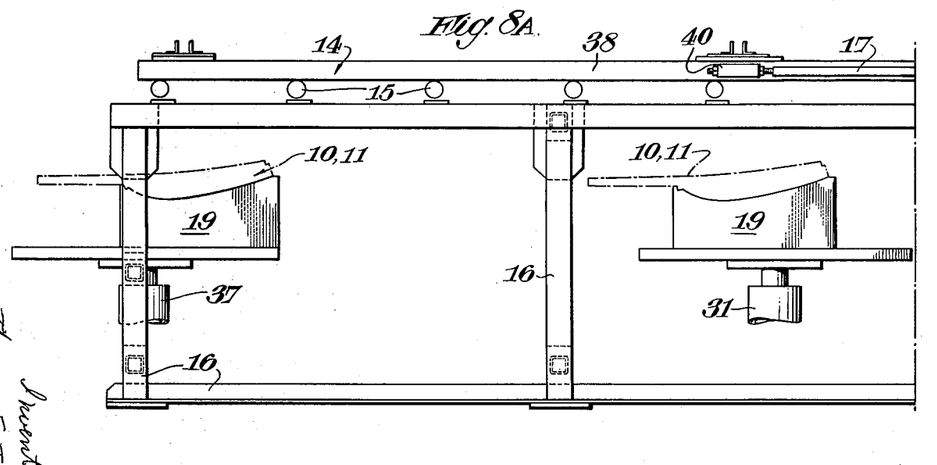
FIGS. 8A to 8D are side views corresponding respectively to FIGS. 7A to 7D.
Figure 8B:
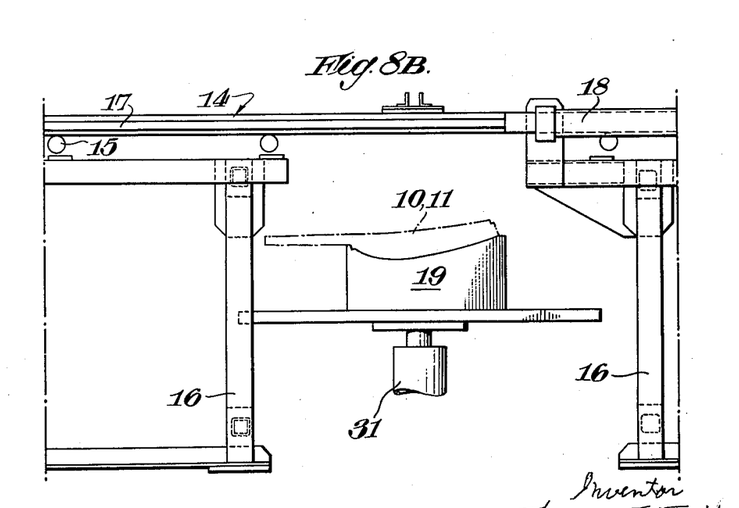
Figure 8C:
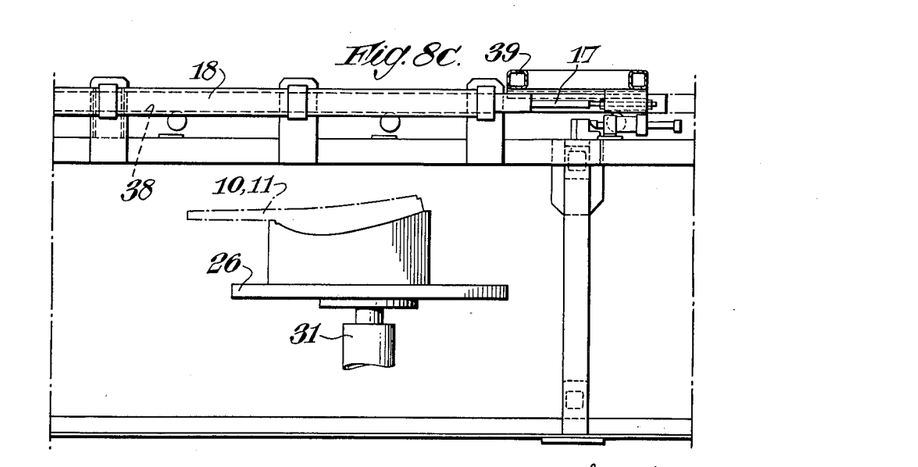
Figure 8D:
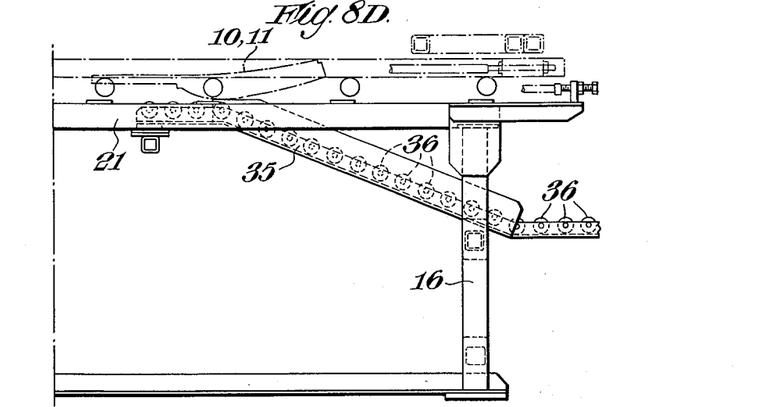

When the panel assemblies are raised (FIG. 4) frame 14 is returned by ram 18 to its initial position leaving the panel assemblies at stations 24, 25 and 26 and the door upon ramp 35. The operator places fresh panels 10 and 11 in position on frame 14 and the tack-welding operation is repeated on the fresh panels (FIG. 5). The panel-planing and tack welding operations at station 23 take place while the operations mentioned in the preceding paragraph are continuing at stations 24, 25 and 26. The tack-welded panels then follow the sequence of operations outlined above (see FIG. 6).

In turn the panel assembly at station 24 will be lowered, secured to frame 14 while clamped between pads 19, 28 then released from the pads and advanced with frame 14 to station 25. While held to the frame the panel assembly is next clamped between pads 19, 28 at station 25 and the assembly is then released from the frame and raised for the clinching operation. Frame 14 is returned to its initial position, the assembly at station 25 lowered and secured to frame 14 when in its initial position and subsequently advanced with the frame to station 26, where it is released from the frame and raised for the second welding operation at station 26. While this proceeds the frame is once more returned to its initial position and the assembly lowered and secured to the frame 14 in its initial position and subsequently advanced to bring the fabricated door above ramp 35. In this final position the door is released from frame 14 and rolls down the ramp 35 where another operator carries it off.

Thus, the several operations are successively performed on a panel assembly and all of the operations are simultaneously performed at the different work stations. The time for which the panel assembly remains at the stations is determined by the fabricating operation which takes the longest time. The sequence of operations cannot be started until the operator has pressed the control switch which ensures that the panels are correctly positioned at station 23 before starting. However, once started the entire sequence of operations at each station (to the stage at which the frame 14 is returned to its initial position) proceeds automatically under control of a master unit which actuated the several pneumatic rams in accordance with a predetermined programme.

Panels correctly located at station 23 are held either to frame 14 or between pads 19, 28 and at each transfer from the frame to the panel-holding pads and vice versa the assembly is first secured before it is released. In this way the assembly is maintained in the same relative position as it passes through the machine and is thus accurately held for welding and clinching by heads 32, 29 and units 30 respectively. The panels of the assembly and the assembly itself is handled by the operator only at station 23.

FIGS. 1 to 6 are purely diagrammatic and are only to illustrate the basis of the present invention. The machine described may be varied and in practice would be as shown in FIGS. 7A to 7D and 8A to 8D. Referring to these figures—at station 23 the support pad is raised by ram 37 instead of lowering heads 32. Of course the panel assembly may be raised at the working stations to perform the fabricating operation or it may be lowered to do so or the welding heads and clinching units may be moved vertically for this purpose or both vertical movement of the heads or units and of the panel assemblies may take place as best suits particular conditions.

The frame 14 in FIGS. 7A–7D and 8A–8D comprises two spaced side members 38 joined by a cross-head 39 (FIGS. 7C and 8C) the rod 17 of pneumatic ram 18 being coupled thereto and at 40 to a member 38.

The welding heads 29, 32 are parts of electric resistance welding machines. The machines are connected in multiple to a series of welding transformers, each welding machine preferably having a plurality of welding dies or electrodes to ensure proper spacing of the welds on the panel assembly. Alternatively, a single electrode may be advanced to a number of indexed positions at each of which the single electrode performs a welding operation as disclosed in U.S. application Serial No. 54,317, filed September 6, 1960, Patent No. 3,068,346.

Figure 9:
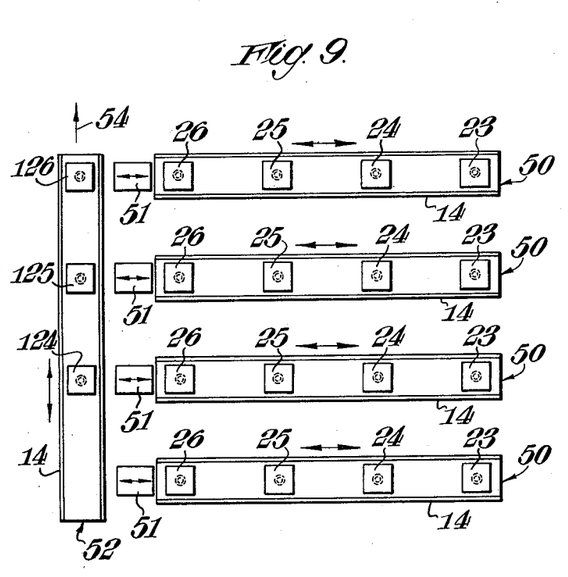
FIG. 9 is a diagrammatic plan view of an adaptation of the invention to simultaneous fabrication of several panel sub-assemblies and the simultaneous fabrication of an assembly from the sub-assemblies.

Referring now to FIG. 9—four machines as described above with reference to FIGS. 1 to 6 are arranged in parallel rows. Each machine is indicated generally by the reference numeral 50. Each machine welds and/or clinches panels (e.g. for a vehicle floor) to form a sub-assembly and each sub-assembly is moved by a transporter 51 from the machine 50 to another similar machine 52 disposed across the ends of the machines 50. The sub-assemblies move through machine 52 where at work stations 124, 125, 126 the sub-assemblies are placed together and welded or otherwise fabricated and the final assembly (e.g. the vehicle floor) is delivered at 54. Each machine 50 and 52 is under the separate control of an operator.

Figure 10:
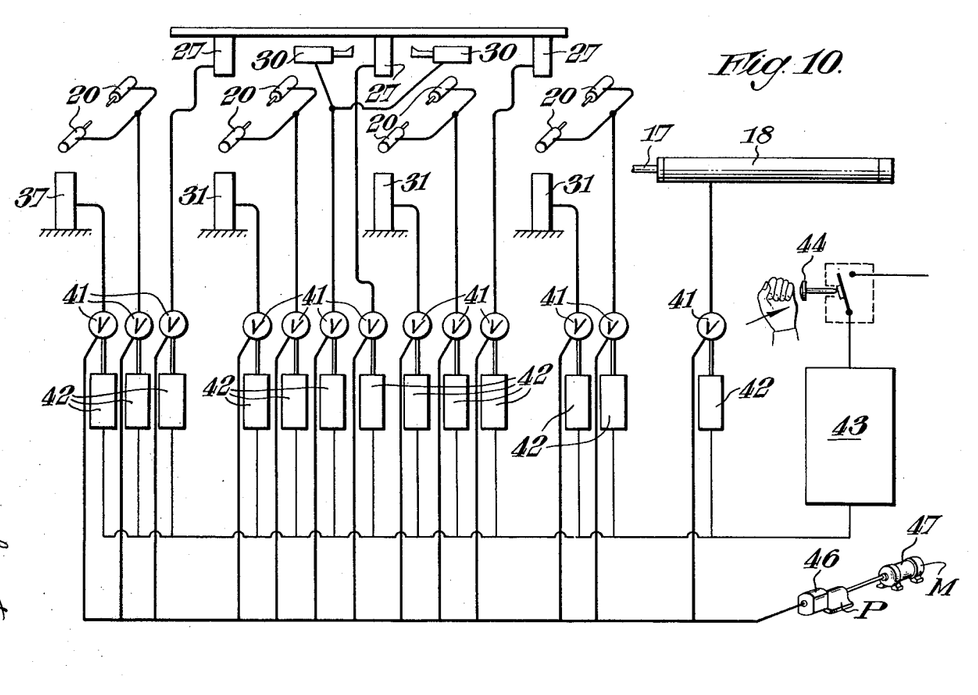
FIG. 10 is a schematic control circuit for a machine of this invention.

The control mechanism for each of machines 50, 52 is illustrated in FIG. 10. Each pneumatic ram 18, 20, 27, 30, 31 and 37 is separately, or in pairs as convenient, connected to a valve 41 which is individually actuated by a solenoid 42. The solenoids are energised and de-energised according to a predetermined programme under the control of a master control unit 43. The unit 43 is started to programme the fabricating operations when the operator (after correctly locating the panels, for instance, at station 23) strikes knob 44 to close switch 45 and thereby set unit 43 in operation.

A pump 46 driven by a motor 47 supplies the pneumatic rams through valves 41.

I claim:

1. A machine for fabricating structures from sheet metal panels comprising: a frame; at least two panel fabricating tools positioned at stations spaced longitudinally along said frame; a carriage for carrying at least a pair of panels spaced longitudinally along said carriage; means within said frame mounting said carriage for reciprocating movement between said stations; means releasably securing panels to said frame; means positioned at each said station for holding each panel upon release from said carriage in position for fabrication by said tools; a control unit for controlling said carriage, means and tools so that all panels are simultaneously advanced by said carriage from one station to the next station and for performing a fabricating operation at the same time at all stations and for holding each panel at each station before release from said carriage and vice versa.

2. A machine according to claim 1 in which said carriage reciprocates horizontally and the panel-holding means at each station moves the panel vertically to a fabricating position.

3. A machine as claimed in claim 2 wherein the means for releasably securing the panels to said carriage and the means for reciprocating said carriage comprises a pneumatic ram in each case.

4. A machine as claimed in claim 2 in which a panel structure is made from a pair of flanged panels by welding the panels together by welding tools and by clinching together the flanges of the panels by clinching units in which the welding tools and the clinching units are carried by a beam extending above said reciprocating carriage.

5. A machine as claimed in claim 2 having a conveyor which constitutes a work-receiving extension at the delivery end of said carriage.

6. A machine assembly for fabricating structures from sheet-metal panels comprising at least two machines as claimed in claim 1 said machines being arranged side-by-side and each being for fabricating a panel sub-structure and another machine according to claim 1 arranged transversely at the delivery ends of said side-by-side machines for receiving the sub-structures produced thereby and for fabricating the panel structure from said sub-structures.

References Cited in the file of this patent

UNITED STATES PATENTS

| | | |
|---|---|---|
| 2,036,105 | Strout | Mar. 31, 1936 |
| 2,431,279 | Remington | Nov. 18, 1947 |
| 2,683,924 | Schryver | July 20, 1954 |
| 2,961,752 | Jorgensen et al. | Nov. 29, 1960 |